United States Patent [19]

Gallagher

[11] 4,221,075
[45] Sep. 9, 1980

[54] MULTIPLE PITCH ANIMAL CALL

[76] Inventor: H. Dan Gallagher, 902 SE. 119th Ave., Vancouver, Wash. 98664

[21] Appl. No.: 939,388

[22] Filed: Sep. 5, 1978

[51] Int. Cl.³ .......................... A63H 5/00; G10D 7/00
[52] U.S. Cl. ........................................ 46/178; 46/180; 84/330
[58] Field of Search ................. 46/180, 177, 178, 179; 84/DIG. 14, 377, 378, 379, 454, 456, 330

[56]  References Cited
U.S. PATENT DOCUMENTS

| | | | |
|---|---|---|---|
| 588,920 | 8/1897 | Hohner | 84/377 |
| 2,182,692 | 12/1939 | Harbin | 46/180 |
| 2,470,823 | 5/1949 | Luch | 46/180 |
| 2,584,549 | 2/1952 | Carhart | 46/180 |
| 2,825,180 | 3/1958 | Dieckmann | 46/180 |
| 3,674,910 | 7/1972 | McKenzie | 84/377 |
| 4,030,241 | 6/1977 | Gallagher | 46/180 |

Primary Examiner—Russell R. Kinsey
Assistant Examiner—Michael J. Foycik, Jr.

[57] ABSTRACT

A simplified combination animal call has a casing divided into identical upper and lower half sections held together by a securing elastic band. Symmetrical channels of different widths spaced longitudinally along half sections provide airways through the casing whose openings act interchangeably as mouthpiece openings along one side of the casing and sound-emitting bells on the opposite side. Air blown through any such airway vibrates a second elastic band which spans each airway to produce an animal-like sound. Multiple airways of different widths make available several different pitch ranges at once. Changing either the size or tension of the vibratory elastic band changes the pitch that is available at each slot. Finally, the pitch produced may be dynamically varied either by changing the tension on the vibratory elastic or by compressing the mouthpiece side of the casing while the device is in use.

11 Claims, 5 Drawing Figures

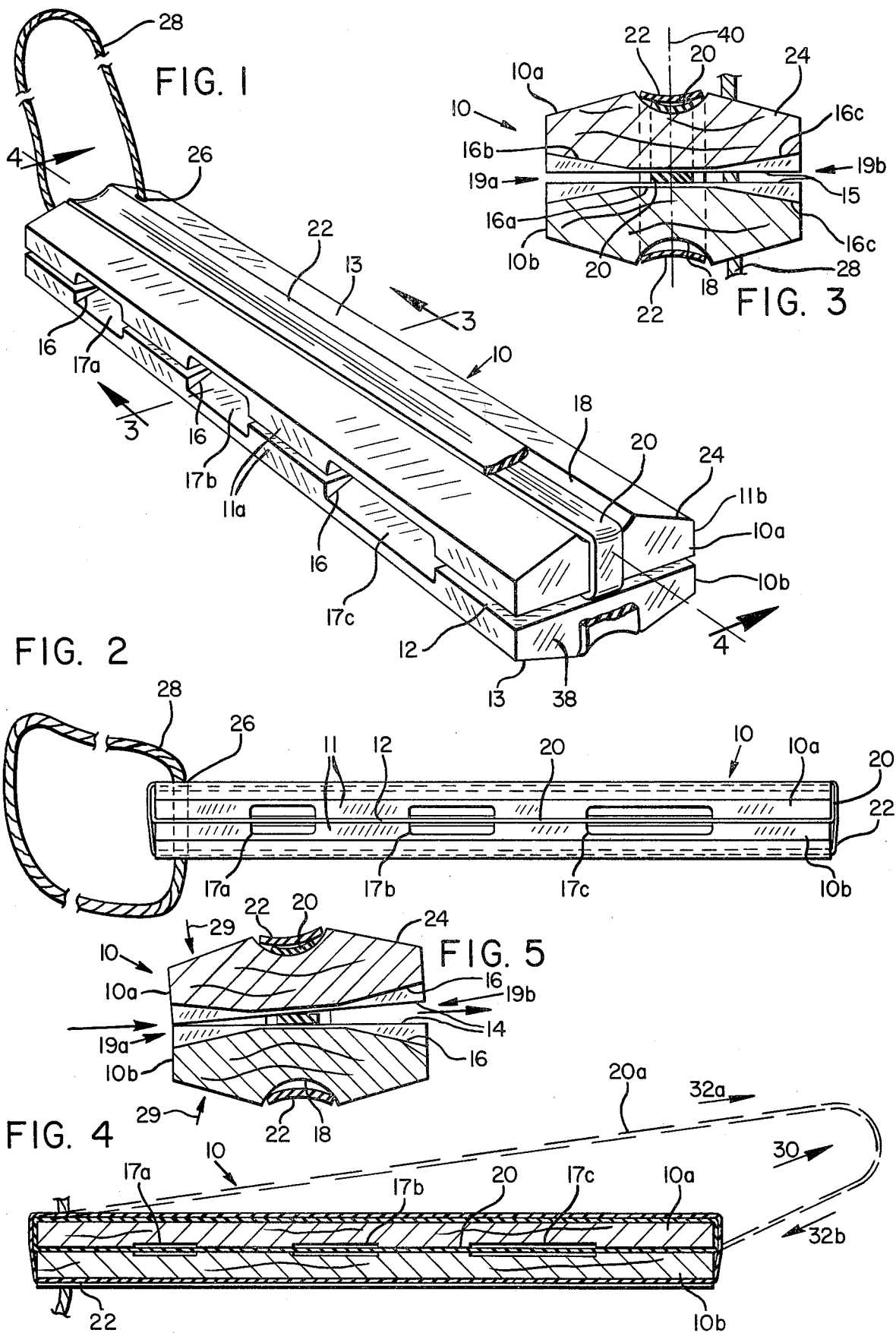

MULTIPLE PITCH ANIMAL CALL

BACKGROUND OF THE INVENTION

1. Field of the Invention

The present invention relates to an animal call and more particularly to an animal call capable of imitating sounds of different animals and producing variable pitch sounds.

2. Decription of the Prior Art

A variety of bird and animal calls have been devised. One type employs a natural, metallic or plastic reed which is vibrated when air is blown across the reed. Most calls of this type produce sound which is generally unsatisfactory for a variety of animal calls and the reeds sometimes crack in very cold weather.

Another common type of animal call is one utilizing an elastic rubber band stretched between two anchor points and across the mouthpiece opening through which air can be blown to vibrate the band and thus produce a sound which is considered by many callers as a more natural sound than that produced by the reed-type calling devices. The use of a single strand vibrating elastic in an animal or bird call has been illustrated in U.S. Pat. 2,182,692 of Harbin; U.S. Pat. No. 2,470,823 of Luch; U.S. Pat. No. 2,584,549 of Carhart; and U.S. Pat. No. 4,030,241 of Gallagher.

The Harbin patent describes a rather elaborate and cumbersome device for changing the tension of a vibrating elastic which is stretched transversely across a single concave cavity so as to enable a caller to vary the pitch of the sound produced from one note to a second note in the manner of the call of a hawk.

The Carhart patent describes a much less complicated call wherein the vibrating elastic is stretched longitudinally across a single concave cavity. It is noted that elastic bands of different widths may be employed to adapt the call for use in calling different kinds of game.

In the Luch patent, a vibrating elastic is disposed longitudinally across flat inner faces of the call. Luch notes that a slight difference in sound can be produced by blowing either in the front or the back of his call because of the different size of air passage around a support. But his call only employs one airway and is not capable of producing multiple ranges of pitch from multiple different-width airways.

Following the Harbin, Luch and Carhart inventions, there were still a number of limitations in bird and animal calls that were not satisfied by any available devices. The existing devices were for the most part capable of producing only one basic sound pitch, or two as in the case of the Harbin invention, and were suitable for calling only one species of animal or bird so that a hunter desiring to hunt one type of game on a particular expedition might have to carry several types of calls with him. Another disadvantage of many call devices, particularly those using a reed, is that they are incapable of producing more than slight variations of pitch to reflect the fact that different animals within the same species produce sounds of different pitch. Therefore, the coyote hunter, for example, might have to carry several different coyote calls, each with a slight difference in pitch, for satisfactory results.

In order to meet the need for a multiplicity of different animal calls in a single instrument Gallagher's call of U.S. Pat. No. 4,030,241 was devised. It provided for two vibrating bands of different sizes to be stretched longitudinally across airways leading to different concave cavities within the call. Thus, two different ranges of pitch could be produced by the call. In addition, slides were provided by which the vibratory elastic bands could be stretched to yield different pitches within a particular range of call being produced. In addtion, the selected pitch of the sound produced may be caused to vary slightly by compressing the mouthpiece opening, reducing its effective size. But the complexity and therefore the expense of that invention have limited its utility and appeal to the sportsman. Furthermore, as with all the vibrating elastic calls, that device lacked a sound-directing bell.

Accordingly, there is a need for a small, simple, and inexpensive single call device capable of calling more than one species of animal or bird. There is also a need for such a calling device having an easily variable pitch which can be varied over a wide range for imitating different species and within a narrower range for imitating different animals of the same species.

SUMMARY OF THE INVENTION

The present invention provides an animal call capable of calling more than one species of animal, such as both deer and various predators. The multiple animal call of the invention provides several ranges of sound pitch so that the most effective pitch for calling a particular animal species can be selected. The invention also provides for a slight variation of the sound pitch within a particular range selected for calling animals of one species so that the most effective sound for a given species can be selected. Finally, the pitch within a particular range may be varied dynamically while calling.

One feature of the invention is the use of a single vibratory elastic band of which different sizes may be used to yield different ranges of pitch for calling different species of animals.

Another feature of the invention is that the vibratory elastic band may be stretched and will be held in place by friction to provide selectively variable tension for varying the sound pitch produced.

Another feature of the invention is that it is possible to blow into either side of the device and emit a sound from the opposite side, openings on both sides being suitable for use either as a mouthpiece or as a bell for emitting the sounds produced.

Still another feature of the invention is the provision of multiple airways of differing widths across which the vibrating elastic is stretched so as to offer within a single call at one time as many pitch ranges as there are airways provided in the call.

Yet another feature is to provide a simple means for removably attaching together the two half-sections which form the casing.

In an illustrated embodiment of the invention, a call device is provided with three airways, the shortest of which produces a sound similar to the squeak of a mouse or the chirp of a bird. The longest airway produces a sound comparable to that of an injured rabbit and the intermediate size produces the sound of a gopher or prairie dog.

Primary objects of the invention include:
(a) ability to imitate the calls of and to call different species of birds and animals, using a wide range of pitches to imitate the calls of different species;
(b) ability to imitate the calls of and to call different birds or animals within the same species by varying the pitch of sound produced within a narrow range to imitate the varying calls of different animals within the same species;

(c) ability to dynamically vary the pitch of sound produced while calling;

(d) ability to direct sound emitted by the call;

(e) ease of operation;

(f) compactness so as to be easily carried;

(g) simplicity of construction for low cost and employing a small number of parts which may be easily disassembled and reassembled in the field with small likelihood of loss of parts; and (h) ease of maintenance at a selected pitch for each animal or bird desired to be called.

The foregoing objects, features and advantages of the present invention will become more apparent from the following detailed description which proceeds with reference to the accompanying drawing.

BRIEF DESCRIPTION OF THE DRAWINGS

In the drawing:

FIG. 1 is a perspective view of the call in accordance with the invention as viewed toward one end, the upper exterior face, and one side of a call in accordance with the invention;

FIG. 2 is a side elevational view showing one side of the call of FIG. 1;

FIG. 3 is a cross-sectional view taken along the line 3—3 of FIG. 1;

FIG. 4 is a longitudinal sectional view taken along line 4—4 of FIG. 1;

FIG. 5 is a cross-sectional view similar to FIG. 3 and also taken along the line 3—3 of FIG. 1, but showing the casing sections compressed together on one side.

DETAILED DESCRIPTION OF THE PREFERRED EMBODIMENT

Referring to FIG. 1, the animal call of the invention comprises a wooden casing 10 having opposite ends 38, opposite airway-opening sides 11a, 11b and opposite upper and lower exterior faces 13. Three airways 17 extend through the casing 10 from mouthpiece openings 19a on one side 11a to sound-emitting openings 19b at the opposite side 11b, best seen in FIG. 3.

The casing 10 is longitudinally divided into two identical casing sections along a parting plane 12 extending across the width of each opening, into an upper section 10a and a lower section 10b having opposed meeting faces 14 (FIG. 5). Three channels 16 extend across the meeting face 14 of each section normal to the centerline 40. The channels are separated longitudinally by lands 15.

Referring to FIG. 3, each channel comprises three channel surfaces symmetrically arranged about the centerline 40. A first, centered shallow channel surface 16a is parallel to the lands 15. Second and third inclined, or beveled, channel surfaces 16b, 16c are symmetrically positioned about the center surface 16a. Each inclined channel surface 16b, 16c is inclined progressively from its adjacent lands 15 in a direction from its intersection with channel surface 16a toward each side 11a, 11b. Thus, each channel is shallow at a position intermediate the mouthpiece and sound-emitting openings and becomes progressively deeper proceeding toward each opening from such intermediate position.

In the assembled casing 10 corresponding channels in each casing section 10a, 10b cooperate to form diminishing cross-sectional area airways 17 through the casing 10, each of which converges heightwise from one opening side 11a to a narrow parallel airway portion having a minimum cross-sectional area opening at the center of the casing and then diverges heightwise to the opposite opening side 11b. The convergent opening functions as a mouthpiece and the divergent opening functions as a sound-directing bell. In the preferred embodiment, each casing section 10a, 10b is symmetrical about the centerline 40 and the casing sections 10a and 10b are identical so that the mouthpiece opening 19a and bell openings 19b are interchangeable.

FIGS. 1, 2 and 4 show three such airways 17a, 17b and 17c having progressively increasing widths. Each airway maintains a constant longitudinal width proceeding side-to-side through the casing.

The upper and lower exterior faces 13 of each casing section 10a, 10b are provided with elastic band-receiving grooves 18 along the centerline 40 of the casing 10. A rubber endless vibratory elastic band 20 is stretched longitudinally about the upper section 10a, within groove 18 on the upper exterior face 13, around each end 38 and across the channeled meeting face 14. In the assembled casing 10 the vibratory elastic band 20 is clamped between the lands 15 of each section 10a, 10b and spans all three airways 17a, 17b and 17c in the region of center channel surfaces 16a.

A securing elastic band 22 placed in the grooves 18 of both sections secures the sections 10a and 10b together. In the embodiment shown, the securing elastic band 22 is wider than the vibratory elastic band 20. Alternatively, two or more securing elastic bands 22 may be provided in a symmetrical position about grooves 18. The latter arrangement will provide easier access to the vibratory elastic band 20 should it be desired to change its tension. That arrangement also provides convenient means for carrying spare vibratory elastic bands of different sizes.

In addition to grooves 18, the outside faces 13 of each section 10a, 10b have outside beveled surfaces 24 to provide a more compact casing and to provide the casing with a thin edge which is more suitable as a mouthpiece.

The casing 10 has a hole 26 drilled through both sections 10a, 10b through which a string 28 is threaded. The string 28 is of sufficient length for the sportsman to carry the call around his neck.

Referring to FIG. 5, it can be seen that the sections 10a, 10b can be rocked about the vibratory elastic band 20 by compressing, for example, the opening side 11 being used as a mouthpiece as indicated by arrows 29. Such action changes the mouthpiece size 19a and the air loss along the parting line 12 and simultaneously changes the size of the bell 19b, thus causing small changes in pitch.

OPERATION

In FIG. 1 the casing is shown in its operating position with the upper and lower casing sections in mating relationship and held together by one securing elastic band 22. A vibratory elastic band 20 is in place, as shown in FIGS. 2 and 3. When the operator wishes to use the call, he holds the casing, which is sized to fit comfortably within the palm of his hand, with the opening 19a of a desired airway 17 on either side of the call serving as a mouthpiece toward him. Placing his mouth over the selected mouthpiece opening 19a, he blows air through the airway 17. As the air enters the airway 17, the airway's convergent shape defining its diminishing cross-sectional area accelerates the air until it reaches approximately maximum velocity at said vibratory elastic band 20. As it passes the portion of the vibrating elastic band 20 stretched across the selected airway, the high speed flow of air sets up a resonant vibration in the elastic whose frequency varies with the thickness of the elastic, its tension and the width of the aperture chosen; which modulates the flow of air through the airway. As the air, now acoustically modulated, flows toward the sound outlet 19b, airway's divergent shape functions as a bell to conduct the sound to the outlet opening side 11b of the call and release it into the atmosphere in a directionalized pattern.

If the sportsman desires to change ranges of pitch of the sound being produced, he need merely switch to another airway. If he is in range which is acceptable, but he desires to make a smaller change in the pitch of the sound being produced, he can lift the vibrating elastic in the manner indicated by arrow 30 in FIG. 4, and by stretching the vibrating elastic band along the top of the upper section 10a in the manner indicated by arrow 32a and feeding the elastic band 20 into the meeting face, thereby reducing the tension of the portion of elastic band 20 spanning the channels 16 which, in turn, reduces the sound pitch produced. Similarly, pitch may be increased by reversing the above process indicated by arrows 32. Note that the static friction between the wooden casing and the rubber elastic bands is sufficient to maintain tension in said vibratory elastic band 20 when stretched.

Also, by using vibratory elastic bands 20 of different sizes, different pitches are produced. By experimentation it has been found that a size 30 rubber band best encompasses the pitch ranges that are most useful in calling predators.

Should the sportsman desire to dynamically vary the pitch of a call, he can do so by stretching and relaxing the vibratory elastic band 20 in the manner indicated by arrow 30 while calling. This method is particularly suited to imitating the descendingly-pitched bark of a gopher or prairie dog. Such a bark is produced by stretching said vibratory elastic band 20 longitudinally away from the animal call and then relaxing the vibratory elastic band 22 while emitting a short burst of air through the center airway 17b.

Alternatively, pitch may be dynamically varied very quickly over a narrow range by compressing alternately the mouth side and then the bell side of the casing, as shown in FIG. 5. When compression of the mouthpiece side for an instant coincides with a short burst of air into the narrowest airway 17a, a short chirp is produced which closely imitates the squeak of a mouse.

Having illustrated and described the principles of my invention by what is presently a preferred embodiment thereof, and alternative embodiments, it should be apparent that such embodiments may be modified in arrangement and detail without departing from such principles. I claim as my invention all such modifications within the true spirit and scope of the following claims.

I claim:
1. A multiple pitch animal call comprising:
    an elongated casing;
    multiple airways of differing longitudinal widths spaced longitudinally apart along said casing, each airway extending from side-to-side through the casing from a mouthpiece opening on one side of the casing to an opposed sound-emitting opening on the opposite side of the casing; and
    a vibratory elastic band extending longitudinally through said casing, a portion of said elastic band being stretched across the width of each airway at a position intermediate said mouthpiece and sound-emitting openings so that air blown into one of the mouthpiece openings passes through its airway above and below the portion of elastic band stretched thereacross to vibrate said portion causing a sound to be emitted from the sound-emitting opening, a different pitched sound being produced by each airway.
2. A call according to claim 1 wherein each airway converges toward a constricted central airway portion from its opposite openings to define a diminishing cross-sectional area airway having a minimum cross-sectional area in said central portion, the vibratory elastic band being stretched across said central airway portion;
    whereby air blown into a mouthpiece opening increases in velocity before passing said elastic band.
3. A call according to claim 2 wherein each airway converges heightwise while maintaining a constant longitudinal width proceeding side-to-side through the casing.
4. A call according to claim 1 wherein the casing is longitudinally divided into separable casing sections along a plane extending across the width of each opening and defining the tops of lands, and the vibratory elastic band extends across said lands so the sections can be rocked to change pitch.
5. A call according to claim 1 wherein the casing is divided longitudinally into separable upper and lower sections along a plane extending across the width of each opening to define the tops of lands separating adjacent channels forming said airways;
    each channel having a bottom wall which is inclined from said plane such that each airway converges heightwise toward a constricted central portion from its opposite openings to define a diminishing cross-sectional minimum cross-sectional area in said central airway portion;
    the vibratory elastic band being stretched across the central portion of each airway and extending across said lands so that the sections can be rocked;
    the lands contacting the elastic band with sufficient friction to maintain the elastic band in stretched condition.
6. A call according to claim 5 in which the casing is divided into mirror image casing sections.
7. A call according to claim 5 in which the call is divided into identical casing sections.
8. A call according to claim 5 in which each airway is defined by two inwardly-opposed channels, one in each section.
9. A call according to claim 8 in which each channel is deepest at opposite openings and becomes progressively shallower in the direction of the central portion of each airway, the channel in said central portion being only slightly relieved from adjacent lands.
10. A multiple pitch animal call comprising:
    an elongated casing divided along a longitudinal plane into longitudinally separable upper and lower sections;
    multiple airways spaced longitudinally apart along the casing and extending from side-to-side through the casing along said plane from a mouthpiece opening on one side of the casing to an opposite sound-emitting opening on the opposite side of the casing;

a first endless elastic band extending longitudinally around one of said sections and having a portion extending longitudinally across each airway at a central position between said opposite openings so that air blown into the mouthpiece opening of one of said airways vibrates the elastic band portion extending thereacross to produce a sound from the sound-emitting opening; and a second endless elastic band extending longitudinally around both of said sections to hold the sections flexibly together;

the airways having different longitudinal widths for producing a different pitch sound from each airway;

each airway having a constant longitudinal width proceeding from side-to-side through the casing;

each airway being defined by a channel in the upper section aligned with a channel of equal longitudinal width in the lower section;

adjacent channels in each section being longitudinally separated from each other by lands having their tops in said plane;

each channel being slightly relieved from said lands at said central position and becoming progressively deeper proceeding toward said opposite openings so that each airway has diminishing cross-sectional area proceeding inwardly from the openings on each side of the casing toward said central position;

the first elastic band being frictionally clamped between lands for maintaining longitudinal tension in the elastic band portion extending across each airway;

the lands of the upper sections being inwardly opposed to the lands of the lower section and spaced therefrom by the thickness of the first elastic band such that the sections can be rocked back and forth about the first elastic band to change the heights of the openings and control the amount of air escaping through spaces between the lands alongside the openings.

11. A call according to claim 10 wherein the casing has upper and lower surfaces which are beveled proceeding from side to side from said mouthpiece openings toward said sound-emitting openings so as to provide the casing with thin edges above and below said mouthpiece openings.

* * * * *